Oct. 18, 1932.    R. D. SALMON ET AL    1,882,954
MOTOR CONTROL DEVICE FOR TELEGRAPH AND LIKE SIGNALING APPARATUS
Filed July 28, 1931
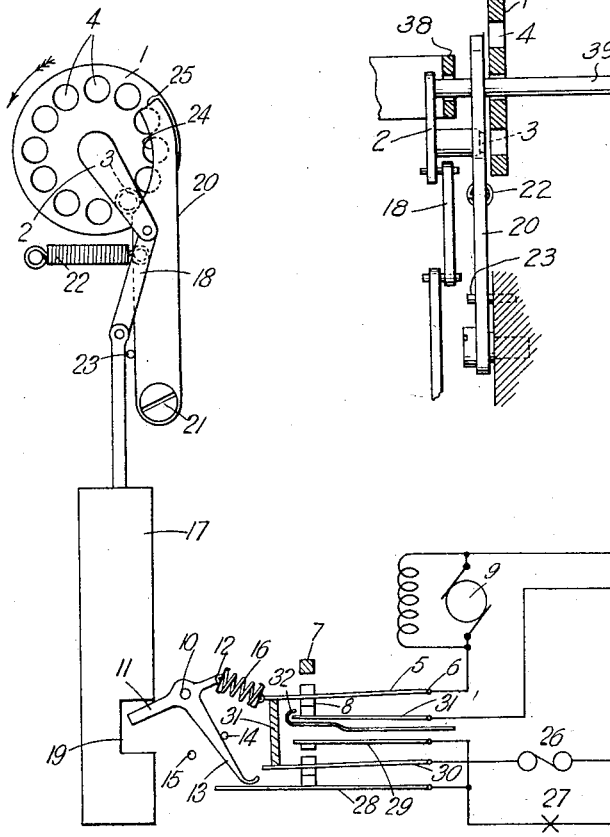
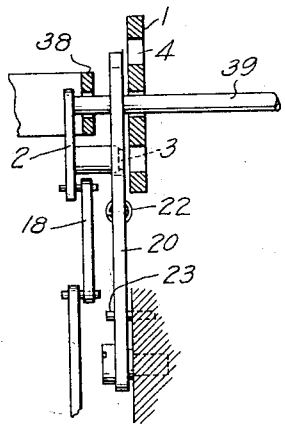
INVENTORS
REGINALD D. SALMON
STANLEY E. KIRK
BY
ATTORNEY Patented Oct. 18, 1932

1,882,954

UNITED STATES PATENT OFFICE

REGINALD DENNIS SALMON AND STANLEY ELLIS KIRK, OF CROYDON, ENGLAND, ASSIGNORS TO CREED AND COMPANY, LIMITED, OF CROYDON, ENGLAND

MOTOR CONTROL DEVICE FOR TELEGRAPH AND LIKE SIGNALING APPARATUS

Application filed July 28, 1931, Serial No. 553,576, and in Great Britain June 11, 1931.

This invention relates to motor control devices for telegraphic and like signaling apparatus, and more particularly to those devices which complete the circuit of a driving motor on receipt of the first impulse of telegraphic signals and after a predetermined interval following the cessation of received signals interrupt the circuit of the driving motor.

Motor control devices of the class referred to consist in general of a member which is slowly movable by the driving motor of the signal receiving apparatus which it is desired to control, a driven member which is engageable with the slowly movable member so as to be moved towards one extreme position but is repeatedly disengaged from the movable member during the continued reception of telegraph signals to return to its initial position under the influence of a restoring force, and switch contacts in the circuit of the driving motor which are closed by the driven member when the latter returns to its initial position and only opened when upon cessation of signaling the driven member is moved by the movable member to its other extreme position.

The object of the present invention is to provide a device of this class having improved features of operation and being particularly though not exclusively adapted for telegraph printing apparatus operating in telegraph exchange systems; the chief of which improved features is that the motor switch contacts are powerfully operated with a quick-make and quick-break action and yet impose a minimum load for the control thereof on the line signal currents.

According to the invention, therefore, in a motor control device of the class referred to the driven member which is intermittently engageable with the slowly movable member is given appreciable mass and is adapted at each of its two extreme positions to move a switch actuating member from one to the other of two positions respectively, and thereby actuate a switch contact lever from one to another of two corresponding positions through spring means strained thereby to maintain both lever and member in either of their two positions respectively.

A second feature is that a reduction is effected in the variations of the time period which elapses following the cessation of received signals before the switch contacts are opened to stop the motor.

Other features will appear from the following description in conjunction with the accompanying single figure of the drawing.

For the purposes of the present description it will be assumed that the general mode of operation of this class of device will be clear from the brief summary given above and also from portions of the following description but for a more full description reference is made to the device shown in U. S. application Serial No. 207,709, now Patent No. 1,834,349.

In the accompanying illustrative drawing, Fig. 1 shows, partly in end elevation and partly in circuit diagram, the means according to the invention for automatically starting and stopping a motor; and Fig. 2 is a side view of the upper portion of the apparatus of Fig. 1.

Referring to the drawing, 1 is a member which is slowly rotated by the driving motor, represented at 9 in the drawing, of the signaling apparatus which it is desired to control. This member 1 may conveniently be constituted by a wheel which is driven from the motor through suitable speed reduction means such as worm gearing (not shown). In the drawing, member 1 is assumed to be rotated in the direction shown by the arrow. Coacting with the slowly moving member 1 is a driven member consisting in the first place of an arm 2 conveniently arranged co-axially with member 1 but independently rotatable, and also movable in an axial direction. Arm 2 is adapted to be intermittently engageable with and disengageable from member 1 under the control of received signals, by means of a pin 3 carried on arm 2 and which is engageable with any one of a circular series of holes 4 arranged in member 1. On receipt of signals, pin 3 and arm 2 are moved in an axial direction to disengage pin 3 from member 1 but during pauses in signaling the arm and pin are moved to engage with one of the holes 4 in member 1 and the arm is then slowly rotated from an initial rest position towards a second extreme position. During the continued reception of signals pin 3 is repeatedly disengaged from member 1 and arm 2 returns to its initial position under the action of a restoring force in the general manner already well-known.

The axial movement of arm 2 and pin 3 in the arrangement according to the present invention is also preferably arranged, as fully described in the above mentioned patent, to be effected by the mechanical action of cams or like means actuated by the signal receiving apparatus during normal signal reception and a line relay responsive to received signals controlling the signal receiving apparatus is only required to effect directly the disengagement of pin 3 from member 1 on the first signal impulse received following the cessation of signaling and the consequent movement of the driven member to its second extreme position. The spindle 39 upon which the arm 2 is mounted can be moved endwise against the action of a spring (not shown) to withdraw the free end of pin 3 from one of the holes 4 of the disc 1. For this purpose there is provided a fork 38 adapted to be moved endwise in an intermittent manner by a cam driven from the driving shaft of the mechanism controlled by the motor 9 and controlled by the received signals in the same manner as is fully described in the aforesaid Patent, 1,834,349.

The method according to the present invention whereby switch contacts in the circuit of the driving motor are operated by the driven member at each of its two extreme positions will now be described, but it will be understood that when the driven member is disengaged from the slowly moving member and returns to its initial position the contacts are closed to complete a circuit through the motor and the contacts remain closed until the driven member is carried by engagement with the slowly moving member during a prolonged pause in signaling to its second extreme position at which position the contacts are opened. In order to provide a powerfully operated quick-make and quick-break action to the switch contacts a contact lever 5 pivoted at 6 is arranged to play between stops 7 and 8. Stop 8 forms a contact and is mounted on a spring contact blade 31 which tends to maintain the contact 8 in an upper position against a stop member 32 in order to provide a slight rubbing action when contact lever 5 is actuated to its lower position against contact 8. This arrangement of stop member 32 and spring contact blade 31 also assists in the quick-break feature of the switch contacts in a manner already well known and also assists in the sequence of switching operations hereinafter to be described when the device is adapted for printing apparatus operating in telegraph exchange systems. In the drawing, contact lever 5 and contact stop 8 are shown as forming part of the circuit of the driving motor 9.

A three-armed actuating member pivoted at 10 on a line substantially central between contact stops 7 and 8 carries two arms 11 and 12 on opposite sides respectively of pivot 10 and a third arm 13 for a purpose which will be hereinafter described. The three-armed member is adapted to oscillate on pivot 10 between two limits set by such as stops 14 and 15 so that arm 12 oscillates to substantially equal amounts on either side of the above mentioned centre line. A stiff compression spring 16 is connected between arm 12 of the three-armed actuating member and the end of contact lever 5, the ends of spring 16 being suitably fashioned as by the pivotally mounted cups shown in the drawing for this purpose. When arm 12 of the actuating member is raised to its upper position the contact lever 5 is held firmly against the lower contact stop 8 by the pressure of spring 16 but when arm 12 is actuated to the lower position the spring is first compressed still further and then presses against contact lever 5 to actuate it to its upper stop 7 where it is again firmly maintained by the spring 16. It will thus be seen that the arrangement of contact lever 5, arm 12 of the three-armed actuating member and spring 16 forms a quick-make and quick-break switch movement wherein the spring means 16 connecting the switch contact lever 5 and the actuating member 12 is strained thereby to maintain both lever and member in either of their two positions respectively.

In order to move the three-armed actuating member from one of its poistions to the other for effecting a corresponding movement to the contact lever 5, a relatively considerable force is required. This is supplied by arm 2 of the driven member near each of its two extreme positions respectively. As this member is actuated by the mechanical power of the driving motor 9 when pin 3 is in engagement with member 1 to carry the driven member to its second extreme position it will be appreciated that ample power is available for the purpose of actuating the contact lever 5 in one direction, but it is possible that the restoring force which returns the driven member to its initial position on disengagement of pin 3 from member 1 will be insufficient to effect the actuation of the contact lever in the other direction.

For the purpose of obviating this possibility the driven member 2 is provided with an appreciable mass so that when it is disengaged from member 1 on resumption of signaling after having been actuated to its extreme position following the previous cessation of signaling the driven member 2 will acquire energy in returning to its initial position under the action of the restoring force and when it has nearly reached this initial position it is arranged to move the actuating member to its other position.

In the drawing the mass of member 2 is shown as a separate vertically movable weight 17 which is connected to arm 2 by a connecting rod 18. The weight 17 therefore in this case serves the dual purpose of the mass referred to above and of the restoring force for arm 2 to return the latter to its initial position on disengagement from member 1. It is not essential for the purposes of the present invention, however, for this mass to be constituted by a vertical falling weight as shown in the particular example of the drawing. It will be appreciated that if desired a horizontal movement of a mass could be provided for the purpose of actuating the switch contacts and a separate spring restoring force provided for restoring the driven member to its initial position.

To actuate the switch contact lever 5 with the arrangement shown, the weight 17 may be formed with a suitable notch 19 as shown the sides of which notch are adapted to cooperate with arm 11 of the three-armed actuating member at each of the two extreme positions of the weight 17. When arm 2 is disengaged from member 1, weight 17 falls and the upper edge of notch 19 depresses arm 11 of the three-armed actuating member and the the switch contact lever 5 is held by the pressure of spring 16 to maintain the circuit of motor 9 in a closed condition. During signaling arm 2 is repeatedly engaged with and disengaged from member 1 but the weight 17 does not rise to any appreciable extent. During a prolonged pause which occurs on termination of signaling the weight 17 continues to be raised and when arm 2 is approaching the vertical position the lower edge of notch 19 engages arm 11 and actuates the three-armed lever to its other position and consequently the contact lever 5 to its upper stop 7 to open the circuit of the motor 9.

As the restoring force tending to return the driven member 2 to its initial position can be seen to be made considerably less than the force which would be required to actuate the contact lever from one position to the other, and moreover as it is preferable to use the arrangement previously mentioned whereby the disengagement of pin 3 on member 2 from member 1 is effected by the mechanical power of the motor during the continued reception of signals, it will be seen that a minimum load is imposed for the control of the device on the line signal currents.

A further feature in the means shown in the drawing resides in the means whereby a reduction in the variations of the time period which elapses following the cessation of signaling before the motor circuit is interrupted. In the devices of this class as hitherto constructed, only a relatively small number of positions are provided at which the driven member 2 can engage with the slowly moving member 1. This is due to the necessity for ensuring that, on the return of the driven member to its initial position from its second extreme position after the motor has been stopped, no possibility of re-engaging with the slowly moving member can occur before the driven member has completely returned and closed the contacts for restarting the motor.

The drawing shows a large number of positions at which the driven member 2 can engage with member 1. These positions correspond to the number of holes in the series 4 in the latter member. A shorter period of time therefore elapses on cessation of signaling before pin 3 engages in one of these holes and the definite period of travel commences to the other extreme position at which the stopping of the motor is effected. In order, however, to ensure that pin 3 cannot re-engage with any other hole of the series 4 upon return from its upper extreme position and before having reached its initial position, a flat guard member 20 pivoted at 21 and actuated by a light spring 22 into a position against stop pin 23 substantially as shown so as normally to cover that portion of the series of holes 4 traversed by the pin 3 in returning with arm 2 to its initial position. A cam surface 24 of guard member 20 is engaged by a portion of pin 3 during the upward movement of arm 2 and the guard member 20 yields laterally under the tension of spring 22 so as not to impede the upward movement of arm 2. When a prolonged signal pause occurs and arm 2 of the driven member is raised to its second extreme position to stop the driving motor, pin 3 is carried beyond the end of guard member 20 which thereupon springs back into position covering the series of holes 4 traversed by pin 3. The upper edge 25 of guard member 20 is formed as a cam surface to guide pin 3 and arm 2 in its axial direction of movement on resumption of signaling and disengagement of pin 3 from member 1 so that the pin 3 is prevented from engaging with any hole of the series 4 of the slowly moving member 1 until the driven member has actuated the contacts on return to its initial position to start the motor.

A further feature shown in the drawing resides in the auxiliary switch means operated by arm 13 of the three-armed actuating member each time the motor switch contacts are opened. This feature renders the device particularly useful for printing apparatus operating in telegraph exchange and like systems. In these systems, on completion of telegraphic communication with a subscriber's station a signal is required to be sent therefrom to a central interconnecting station or exchange to indicate that the connection to the subscriber's station can be cleared. The signal can be sent by the manual operation of a key at the subscriber's station, but, in systems employing printing apparatus to which the device according to the present invention is applicable, the reception of telegraphic messages can be entirely automatic. The auxiliary switch means above referred to is therefore adapted for the purpose of sending a clearing signal by the operation of the device which effects the interruption of the driving motor circuit as above described.

A preferred method of sending the clearing signal to the central station, as above described, particularly in the closed circuit arrangements, usually adopted for the telegraph line circuit, is to open this line circuit for a predetermined interval of time and then to reclose the circuit in preparation for the further reception of telegraph signal impulses at a subsequent period. In the drawing the line circuit is shown as including the line relay 26 and transmitting contacts 27 in simple circuit. Arm 13 of the three-armed actuating member is adapted to cooperate with a contact blade 28 which together with a second contact blade 29 is connected to one line of the line circuit. A third contact blade 30 connected to the second line of the line circuit is adapted to play between and make contact alternately with suitable contacts on blades 28 and 29 and is operated by an insulating extension 31 from contact lever 5 of the motor control switch. When the three-armed actuating member is in the position in which contact lever 5 has closed the circuit of the driving motor 9, the insulating extension 31 holds blade 30 out of contact with the upper blade 29 and in contact with the lower blade 28 to maintain the line circuit closed therethrough. In this position arm 13 is held just clear of the extension of blade 28. When the three-armed actuating member is actuated to the opposite position following the cessation of signaling, blade 28 is moved from contact with blade 30 by arm 13 immediately the three-armed actuating member commences to move to its opposite position. This opens the line circuit for sending the clearing signal but upon the actuation of the motor switch contact lever 5 to its upper position to open the motor circuit, blade 30 rises into contact with the upper blade 29 and thereby recloses the line circuit in preparation for the subsequent reception of further signaling impulses.

The actual details of the switch mechanism for effecting the transmisison of the clearing signal can be modified in accordance with requirements but the above described example will show how the device according to the present invention can also be adapted for the purpose of sending a clearing signal to indicate that telegraphic communication has ceased and at approximately the same time that the circuit of the driving motor is opened.

What is claimed is:

1. Motor control device for telegraphic and like signalling apparatus and comprising, a driving motor, a member slowly movable thereby, a driven member having appreciable mass engageable with said slowly movable member to be moved towards an extreme position but disengageable therefrom under the control of line signals, means for restoring said driven member to an initial position on disengagement from said slowly movable member, a switch actuating member operable from one to the other of two positions and actuated thereto by said driven member at each of the two extreme positions respectively, a switch contact lever controlling said motor and likewise operable from one to the other of two positions, and spring means connecting said switch contact lever and said actuating member and strained thereby to maintain both lever and member in either of their two positions respectively.

2. Motor control device comprising, a driving motor, a member slowly rotated thereby, an arm engageable therewith under the control of received signals, a vertically movable weight connected to said arm and constituting a restoring force for said arm and a mass movable with the arm, an actuating member operable from one to the other of two positions and actuated thereto by said driven member at each of the two extreme positions respectively, a switch contact lever controlling said motor and likewise operable from one to the other of two positions, and spring means connecting said switch contact lever and said actuating member and strained thereby to maintain both lever and member in either of their two positions respectively.

3. In a motor control device for signalling apparatus a driving motor, a wheel slowly rotated thereby, an arm engageable with said wheel at any one of a plurality of positions, switch means controlling said motor and operable by said arm at each of two positions thereof, and guard means to prevent engagement of said arm with said wheel upon return from one extreme position to the other.

4. In a motor control device for signalling apparatus, a mass movable between two extreme positions, an actuating member operated thereby and a contact lever each movable independently on a pivot and having an arm operable between two positions substantially equidistant on either side of a centre line joining said pivots, and a spring pivotally connected between the ends of each of said arms for effecting a quick-make and quick-break motion to said contact lever by said actuating member.

5. In a motor control device for signalling apparatus, a driving motor, a mass movable between two extreme positions under the control of received signals, a switch actuating member operated thereby, a contact lever in the circuit of said motor, actuating spring means between said actuating member and said contact lever, and switch means in the circuit of said signalling apparatus also operated by said actuating member at each of the two positions of said mass.

6. An electric motor, a signalling line for controlling said motor from a distance, a snap-action switch for closing the circuit of said motor, a member having a substantial mass mounted to have freedom of movement from one position to another, means for utilizing the energy stored in said mass in moving from one position to the other for actuating said switch and means for releasing said mass for movement from one position to the other in response to a signal received over said line.

7. An electric motor, a signalling line for controlling said motor from a distance, a snap-action switch for closing the circuit of said motor, a weight, means for utilizing the energy stored in said weight in falling for actuating said switch and means for releasing said weight under the control of a signal sent over said line.

In witness whereof we hereunto subscribe our names this 23rd day of June, 1931.

REGINALD DENNIS SALMON.
STANLEY ELLIS KIRK.